(12) United States Patent
Kallevig

(10) Patent No.: US 8,047,310 B2  
(45) Date of Patent: Nov. 1, 2011

(54) POWER VEHICLE INCORPORATING VELOCITY CONTROL SYSTEM

(75) Inventor: Jeffrey B. Kallevig, Eden Prairie, MN (US)

(73) Assignee: The Toro Company, Bloomington, MN (US)

(*) Notice: Subject to any disclaimer, the term of this patent is extended or adjusted under 35 U.S.C. 154(b) by 349 days.

(21) Appl. No.: 12/275,381

(22) Filed: Nov. 21, 2008

(65) Prior Publication Data

US 2010/0126792 A1 May 27, 2010

(51) Int. Cl.
*A01D 69/00* (2006.01)

(52) U.S. Cl. .............. 180/6.48; 180/6.2; 340/457.3; 56/10.2 A

(58) Field of Classification Search ........... 180/6.2, 180/6.48; 340/457.3; 56/10.2 A
See application file for complete search history.

(56) References Cited

U.S. PATENT DOCUMENTS

| | | | | |
|---|---|---|---|---|
| 4,558,558 A * | 12/1985 | Horner et al. | ......... | 56/11.3 |
| 5,511,367 A * | 4/1996 | Powers et al. | ......... | 56/11.2 |
| 5,848,520 A * | 12/1998 | Arfstrom et al. | ......... | 56/11.4 |
| 6,098,385 A * | 8/2000 | Turk | ......... | 56/11.3 |
| 6,105,348 A * | 8/2000 | Turk et al. | ......... | 56/10.5 |
| 6,155,033 A | 12/2000 | Wians et al. | | |
| 6,301,864 B1 * | 10/2001 | Damie et al. | ......... | 56/11.3 |
| 6,557,331 B2 * | 5/2003 | Busboom et al. | ......... | 56/10.8 |
| 6,640,526 B2 * | 11/2003 | Velke et al. | ......... | 56/10.8 |
| 6,688,090 B2 * | 2/2004 | Velke et al. | ......... | 56/14.7 |
| 6,729,115 B2 * | 5/2004 | Bartel | ......... | 56/11.3 |
| 6,782,964 B1 * | 8/2004 | Korthals et al. | ......... | 180/273 |
| 6,912,831 B2 * | 7/2005 | Velke et al. | ......... | 56/10.9 |
| 6,951,092 B2 * | 10/2005 | Busboom et al. | ......... | 56/10.8 |
| 6,968,687 B1 | 11/2005 | Poplawski et al. | | |
| 7,213,662 B2 * | 5/2007 | Crumly | ......... | 180/6.48 |
| 7,325,388 B2 | 2/2008 | Wright et al. | | |
| 7,458,588 B2 * | 12/2008 | Kallevig | ......... | 280/32.7 |
| 7,607,283 B2 | 10/2009 | Wright et al. | | |
| 7,647,754 B2 | 1/2010 | Velke et al. | | |
| 7,857,089 B1 | 12/2010 | Sugden et al. | | |
| 2001/0001170 A1 * | 5/2001 | Velke et al. | ......... | 56/14.7 |

OTHER PUBLICATIONS

"Stander® ZK Commerical Mower Owner's Manual—For Stander ZK Serial # 43106 and higher until superseded," Wright Manufacturing, Inc., May 2008, 20 pgs.

"Stander® ZK Commerical Mower Owner's Manual—For Stander ZK Serial # 46090 and higher until superseded," Wright Manufacturing, Inc., Oct. 2008, 20 pgs.

(Continued)

*Primary Examiner* — Anne Marie M Boehler
*Assistant Examiner* — Michael R Stabley
(74) *Attorney, Agent, or Firm* — Mueting, Raasch & Gebhardt, P.A.

(57) ABSTRACT

The present invention relates to powered vehicles (e.g., lawn mowers) and, more particularly, to a velocity control system for use with such a vehicle. In one embodiment, the vehicle includes a power source such as an internal combustion engine and one or more drive control levers incrementally movable between a neutral position and a maximum velocity position. The system may also include a velocity adjustment member and associated mechanism that permits changing of a ratio between control lever movement and velocity of associated drive members or wheels. Thus, the system may limit a maximum ground velocity of the vehicle while the drive control lever(s) are positioned in the maximum velocity position and while an output level of the power source is maintained at a constant level.

14 Claims, 8 Drawing Sheets

OTHER PUBLICATIONS

"Peaucellier-Lipkin linkage," *Wikipedia*, [online];[retrieved on Sep. 24, 2010] from the Internet. Retrieved from the Internet:<URL:http://en.wikipedia.org/wiki/Peaucellier-Lipkin_linkage>; 3 pgs.
U.S. Appl. No. 12/827,269, filed Jun. 30, 2010, Papke et al.
U.S. Appl. No. 12/882,610, filed Sep. 15, 2010, Porter et al.
U.S. Appl. No. 13/082,933, filed Apr. 8, 2011, Papke et al.
Office Action issued Jun. 10, 2011, in U.S. Appl. No. 12/827,269, 10 pgs.
Office Action issued Jun. 10, 2011, in U.S. Appl. No. 13/082,933, 6 pgs.

* cited by examiner

POWER VEHICLE INCORPORATING VELOCITY CONTROL SYSTEM

TECHNICAL FIELD

The present invention relates generally to power vehicles and, more particularly, to a velocity control system for controlling a maximum velocity of a power vehicle independent of an output level of the power source.

BACKGROUND

Power vehicles for carrying out diverse tasks are known. For instance, power lawn mowers are well known for use in turf and lawn maintenance. Such mowers may range from small, walk-behind mowers such as those used by homeowners, to professional grade riding mowers adept at mowing correspondingly larger areas. Between these two categories lies what are commonly referred to as "mid-size" mowers.

Generally speaking, mid-size mowers are self-propelled units having a cutting width of approximately 36-60 inches and are typically configured as either riding (e.g., ride-on or stand-on) or walk-behind units. While the present invention is directed to a velocity control system for use with a wide variety of riding or walk-behind vehicles, it will, for the sake of brevity, be described with respect to mid-size mowers.

Modern mid-size mowers incorporate a prime mover (e.g., internal combustion engine) and a hydraulic drive system. The drive system may include left and right hydraulic motors coupled to left and right drive wheels, respectively. Power may be transmitted from the prime mover to the left and right hydraulic motors, e.g., via one or more pumps, to drive the left and right drive wheels independently. The rotational speed and direction of each drive wheel may then be controlled by associated drive control levers under the control of an operator. By manipulating the control levers independently, each drive wheel can be separately driven forward or backwards at varying speeds. Thus, the mower may be propelled forwardly or in reverse. By powering one wheel in the forward direction and slowing, stopping, or powering the opposite wheel in the reverse direction, the mower can execute a turn.

Each drive control lever may generally be positioned between a neutral and a full forward (and possibly a full reverse) position. The levers are generally sized and configured so that the operator may manipulate the levers over their normal range of motion (e.g., from neutral to full forward) without relocating his or her hands. In the full forward position, the levers may be configured to rest against stationary bars. Such a configuration permits the operator to hold the levers against a fixed stop during normal operation, reducing potential fatigue in the hands, wrists, and arms. The fixed stop may also provide a degree of lever stability, minimizing inadvertent lever movement as a result of vehicle motion.

While effective, this fall forward position may result in a vehicle speed in excess of what is desired for some mowing tasks. To reduce the speed, the operator may back the control levers off from the full forward position. Unfortunately, this technique denies the operator the ability to rest the levers against the fixed stops. Alternatively, the engine throttle may be reduced. While throttle reduction is effective at reducing maximum vehicle speed, it also reduces the power level or rotational speed of any implements, e.g., the mower blades. As a result, cutting efficiently of the mower may be reduced.

To address this issue, some mowers may provide a control lever travel limiter. The limiter may selectively restrict travel of each drive control lever by interposing an intermediate rest or stop that limits lever movement to a position that is less than the normal full forward position of the lever. For example, a typical mower may have a maximum forward velocity of four mph and the control levers may have a corresponding normal maximum travel of four inches. As a result, movement of the levers from the initial ("zero") position to the full forward ("four inch") position results in a change in velocity between zero and four mph. The travel limiter may selectively interpose a stop positioned at, for example, three inches of lever travel, such that the vehicle velocity is now effectively limited to a range of zero to three mph. While such a configuration may contribute to ease of operation (the levers may still be held against a stop element at the lower three mph speed), it does not alter lever sensitivity (the ratio of control lever travel to vehicle ground velocity). Moreover, such devices may be time consuming, complicated to operate, and/or difficult (or even unable) to engage while the mower is moving.

SUMMARY

The present invention may overcome these and other issues with prior art mowers by providing a vehicle incorporating a velocity control system. In one embodiment, a self-propelled vehicle is provided and may include one or more of the following features: a chassis; first and second drive members coupled to opposing sides of the chassis; and a prime mover attached to the chassis and operatively coupled to both the first and second drive members, the prime mover configurable to deliver a constant level of output. First and second control levers may also be attached to the chassis and operable to independently vary, while the prime mover maintains the constant level of output, a velocity of the first and second drive members, respectively. Each control lever may be movable incrementally between a first position corresponding to zero velocity of its respective drive member, and a second position corresponding to a maximum forward velocity of its respective drive member. A drive velocity adjustment member may also be included and operatively coupled to both the first and second control levers. The velocity adjustment member is movable, while the prime mover maintains the constant level of output, between: a first setting wherein the maximum forward velocity of each drive member, when its respective drive control lever is in the second position, is set to a first predetermined value; and a second setting wherein the maximum forward velocity of each drive member, when its respective drive control lever is in the second position, is set to a second predetermined value greater than the first predetermined value.

In another exemplary embodiment, a self-propelled vehicle is provided. The vehicle may include one or more of the following features: a chassis; first and second drive members coupled to opposing sides of the chassis; and a prime mover attached to the chassis and operatively coupled to both the first and second drive members, wherein the prime mover is configurable to deliver a constant level of output. First and second control levers may also be provided and attached to the chassis. The control levers are operable to independently vary, while the prime mover maintains the constant level of output, a velocity of the first and second drive members, respectively. Each control lever is movable incrementally between a first position corresponding to zero velocity of its respective drive member, and a second position corresponding to a maximum forward velocity of its respective drive member. A drive velocity adjustment member operatively coupled to both the first and second control levers may also be provided. The velocity adjustment member is movable, while the prime mover maintains the constant level of output, between: a first setting wherein a ratio of motion of each of the first and second control levers to velocity of its associated drive member is set to a first value, and a second setting wherein the ratio of motion of each of the first and second control levers to velocity of its associated drive member is set to a second value greater than the first value.

The above summary is not intended to describe each embodiment or every implementation of the present invention. Rather, a more complete understanding of the invention will become apparent and appreciated by reference to the following Detailed Description of Exemplary Embodiments and claims in view of the accompanying figures of the drawing.

BRIEF DESCRIPTION OF THE VIEWS OF THE DRAWING

The present invention will be further described with reference to the figures of the drawing, wherein:

FIGS. 7A and 7B illustrate side elevation views of a portion of the velocity control system when a respective control lever is located in a neutral position, wherein: FIG. 7A illustrates the velocity control system set for a minimum velocity; and FIG. 7B illustrates the velocity control system set for a maximum velocity; and FIGS. 8A and 8B illustrate side elevation views of the portion of the velocity control system of FIGS. 7A-7B, but with the respective control lever located in a full forward position, wherein: FIG. 8A illustrates the velocity control system set for a minimum velocity (similar to FIG. 7A); and FIG. 8B illustrates the velocity control system set for a maximum velocity (similar to FIG. 7B).

Figure 1:
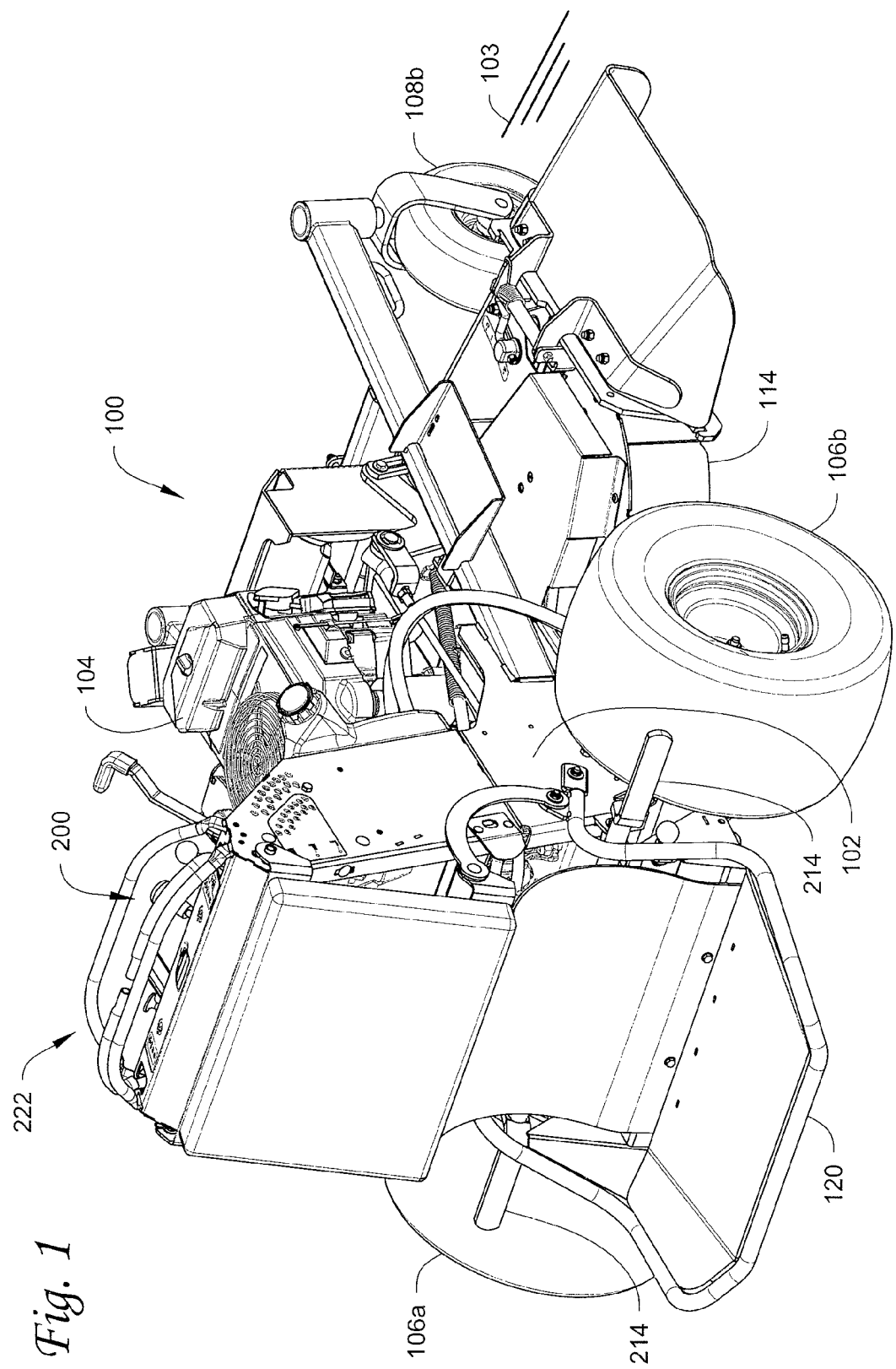
FIG. 1 is a rear perspective view of an exemplary vehicle, e.g., mid-size mower, incorporating a velocity control system in accordance with one embodiment of the invention, the mower illustrated with a standing platform in a deployed position.

The figures are rendered primarily for clarity and, as a result, are not necessarily drawn to scale.

DETAILED DESCRIPTION OF EXEMPLARY EMBODIMENTS

In the following detailed description of illustrative embodiments of the invention, reference is made to the accompanying figures of the drawing which form a part hereof, and in which are shown, by way of illustration, specific embodiments in which the invention may be practiced. It is to be understood that other embodiments may be utilized and structural changes may be made without departing from the scope of the instant invention.

Embodiments of the present invention are directed to self-propelled vehicles incorporating a power source. More particularly, embodiments of the present invention may include a velocity control system for changing a maximum velocity of the vehicle when speed control input of the vehicle is configured for maximum velocity and the output from the power source is maintained at a constant level. Accordingly, the maximum speed of the vehicle may be adjusted without adversely impacting power delivered to other vehicle subsystems.

Unlike some conventional systems that provide a travel limiter to restrict a maximum position of the speed control input (e.g., speed control lever) to a lesser or intermediate position, embodiments of the present invention may provide velocity control systems that actually vary a ratio between input (control lever movement) and output (vehicle ground speed) regardless of the power source output level. Thus, unlike travel limiters, full control lever motion is available regardless of the setting of the velocity control mechanism.

FIG. 1 shows a velocity control system in accordance with one embodiment of the present invention as it may be incorporated on a self-propelled vehicle, e.g., a mid-size, walk-behind or ride-on lawn mower 100. While, for the sake of brevity, embodiments of the invention are herein described with respect to a mid-size lawn mower (hereinafter generically referred to merely as a "mower"), those of skill in the art will realize that the invention is equally applicable to other types of walk-behind, ride-behind (e.g., such as those utilizing sulkies), and conventional ride-on mowers as well as to most any other walk-behind, ride-behind, or ride-on self-propelled, ground working vehicle, e.g., skid-steer loader, aerator, snow thrower, tiller, etc.

While the general construction of the mower 100 is not necessarily central to an understanding of the invention (e.g., other mower configurations may be utilized without departing from the scope of the invention), it will now be briefly described. FIG. 1 illustrates an exemplary mower 100 having a chassis 102 supporting a power source or prime mover, e.g., internal combustion engine 104. A pair of transversely opposing, ground engaging drive members, e.g., first and second wheels 106, may be coupled to opposing sides of the chassis to support and propel the mower 100 relative to a ground surface 103. Each drive wheel 106 may be powered by its own hydrostatic motor 105 (shown diagrammatically in FIG. 4) that receives power from, at least in one embodiment, its own hydraulic pump 107 (see FIGS. 4 and 5). The pumps 107 may be attached to the chassis 102 and powered by the engine 104. While not illustrated, other drive systems, e.g., gear or pulley driven systems, may also be utilized without departing from the scope of the invention.

Operator controls, as further described below, permit independent control of the speed and direction of each drive wheel 106, allowing control of mower 100 speed and direction from a walking or riding (e.g., standing) position generally behind the mower 100. A pair of front swiveling caster wheels 108 (only right wheel illustrated in FIG. 1), which are preferably connected to forwardly extending chassis rails, may support the front of the mower 100 in rolling engagement with the ground.

Although the illustrated mower has the drive wheels 106 in the rear and caster wheels 108 in front, this configuration is not limiting. For example, other embodiments may reverse the location of the wheels, e.g., drive wheels in front and driven or undriven wheels in back. Moreover, other configurations may use different wheel configurations altogether, e.g., a tri-wheel configuration. These and other embodiments are certainly possible without departing from the scope of the invention.

As used herein, relative terms such as "left," "right," "fore," "forward," "aft," "rearward," "top," "bottom," "upper," "lower," "horizontal," "vertical," and the like are from the perspective of one operating the mower 100 while the mower is in an operating configuration, e.g., while the mower 100 is positioned such that the wheels 106 and 108 rest upon the generally horizontal ground surface 103 as shown in FIG. 1. These terms are used herein to simplify the description, however, and not to limit the scope of the invention in any way.

Moreover, the suffixes "a" and "b" may be used throughout this description to denote various left- and right-side parts/features, respectively. However, in most pertinent respects, the parts/features denoted with "a" and "b" suffixes are substantially identical to, or mirror images of, one another. It is understood that, unless otherwise noted, the description of an individual part/feature (e.g., part/feature identified with an "a" suffix) also applies to the opposing part/feature (e.g., part/feature identified with a "b" suffix). Similarly, the description of a part/feature identified with no suffix may apply, unless noted otherwise, to both the corresponding left and right part/feature.

A cutting deck 114 may be mounted to a lower side of the chassis 102 generally between the drive wheels 106 and the caster wheels 108. The cutting deck 114 may include one or more cutting blades (not shown) as known in the art. The cutting blades may be operatively powered, via spindles connected to the deck, by the engine 104. During operation, power is selectively delivered to the cutting deck 114, whereby the blades rotate at a speed sufficient to sever grass and other vegetation passing underneath the cutting deck.

Figure 2:
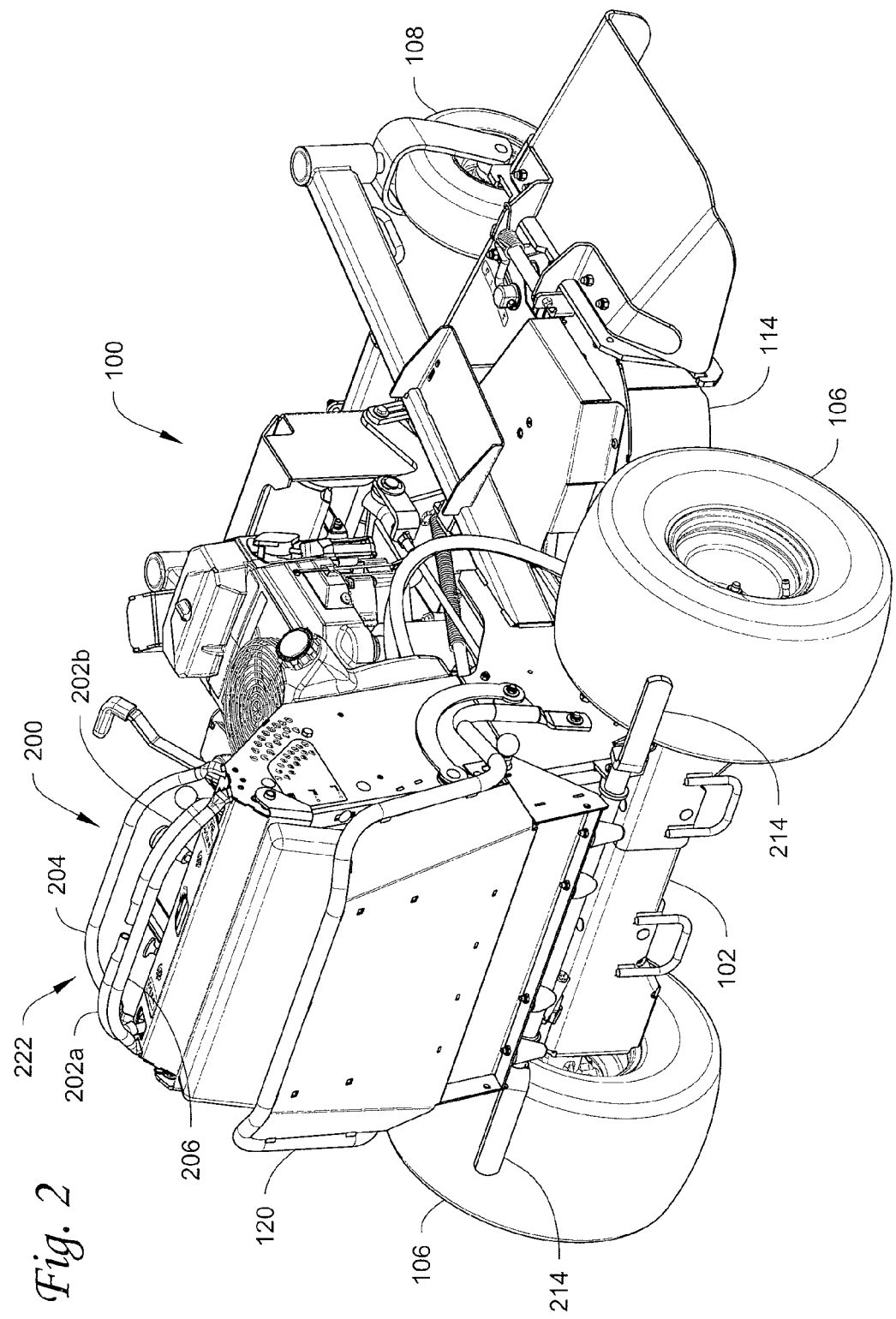
FIG. 2 illustrates the mower of FIG. 1 with the standing platform in a stowed position.

The exemplary mower 100 may further include a standing platform 120 that may be moved between a deployed position as shown in FIG. 1, and a stowed position as shown in FIG. 2. In the deployed position, an operator may stand upon the platform during vehicle operation. Alternatively, the platform may be moved to the stowed position of FIG. 2 to accommodate the operator in a walk-behind configuration.

Figure 3:
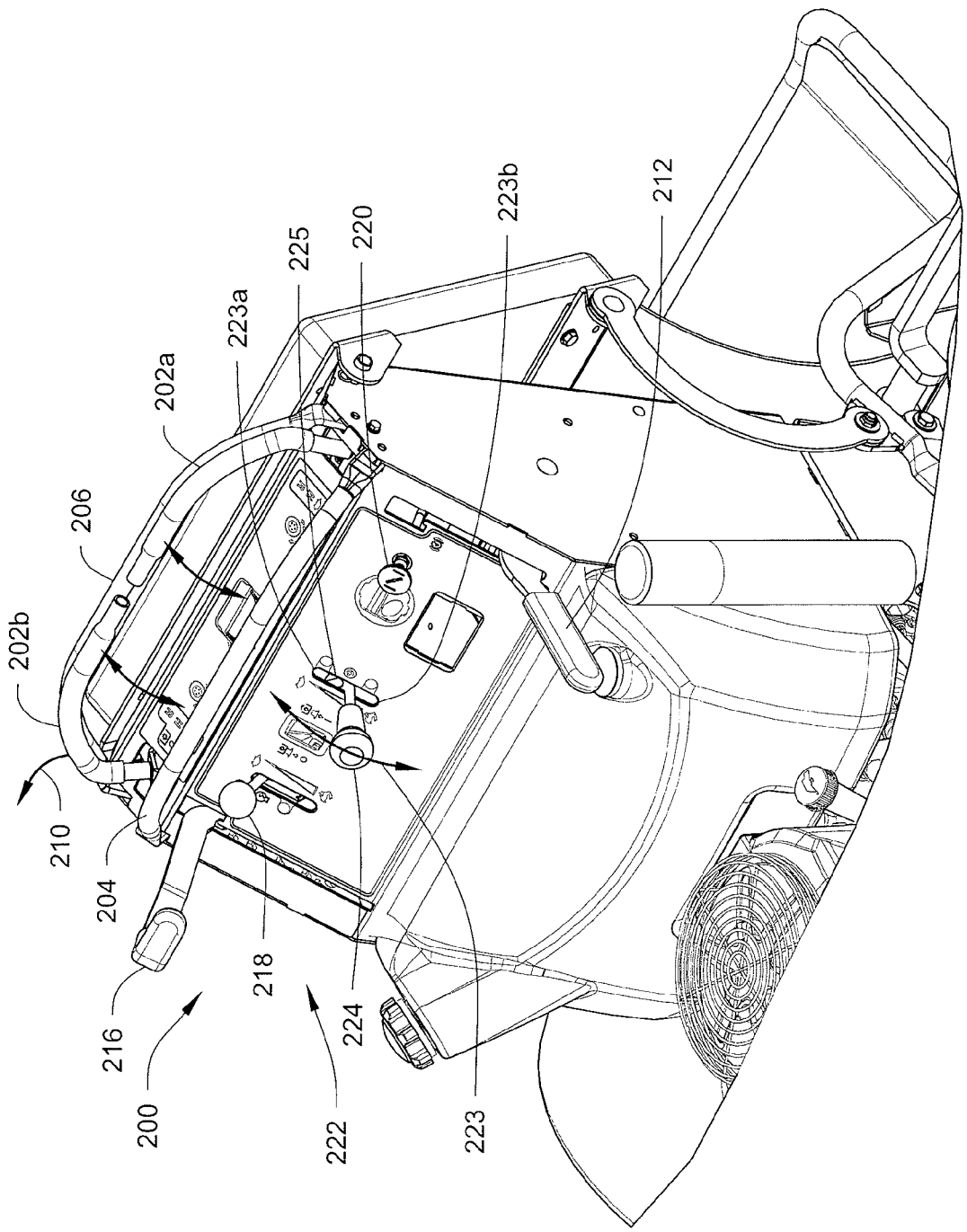
FIG. 3 is a front perspective view of a control area of the mower of FIG. 1.

As illustrated in FIGS. 2-3, the mower 100 may further include an operator control system 200. In the illustrated embodiment, the control system 200 may include operator controls that are mounted to upwardly extending portions of the chassis 102 near the rearward end of the mower (e.g., a control area) such that the controls are located within comfortable reach of an operator standing either behind the mower or upon the platform 120.

The control system may include a first control lever 202a and a second control lever 202b pivotally attached to the chassis. The control levers 202 may be configured to pivot about a generally transverse axis between a first or forward fixed stop 204, and a second or rearward fixed stop 206. One or both of the control levers 202 (e.g., 202b as shown in FIG. 3) may also be biased for pivotal outward movement (e.g., in a direction 210 about an axis generally parallel to a longitudinal axis of the mower 100). Such a configuration may permit, upon pivotal inward movement of the control lever 202b by the operator to the position shown in FIG. 3, activation of an operator presence switch (not shown). As is recognized in the art, activation of the switch may be requisite to activation of some of the mower subsystems.

The control levers 202 may further be biased to an intermediate, neutral position between the two stops 204 and 206 as shown in FIGS. 2 and 3. Movement of either of the control levers 202 (e.g., lever 202a) forwardly (e.g., towards the forward stop 204) may result in an incremental increase in forward speed of the respective drive wheel 106 (e.g., wheel 106a). Similarly, movement of either of the control levers rearwardly (e.g., towards the rearward stop 206) may result in an incremental increase in rearward speed of the respective drive wheel 106. The neutral position of the control levers 202 may be located more closely to the rearward stop 206 to provide a greater range of movement for forward travel.

The control levers 202 may each thus be movable between a first neutral position corresponding to first or zero forward velocity of its respective drive wheel 106, and a second position (abutting the forward stop 204) corresponding to a second or maximum forward velocity of its respective drive wheel. Stated another way, each control lever 202 may independently vary a velocity of its respective drive wheel 106 incrementally between a first or zero forward velocity and a second or maximum forward velocity without varying the engine throttle, (e.g., while the engine maintains a constant level of output). Each lever 202 may additionally be movable to a third position (abutting the stop 206) corresponding to a maximum reverse velocity of its respective drive wheel.

As FIG. 3 illustrates, the control system 200 may also include other features. For instance, a parking brake handle 212 may selectively activate a brake (e.g., brake members 214 in FIGS. 1 and 2) when the vehicle is parked. A deck height adjustment lever 216 may also be provided to adjust the cutting height of the deck 114. Other controls, including for example, a throttle lever 218 to control the speed (or level of output) of the engine 104 and a deck engagement control 220 to initiate and terminate power delivery to the cutting blades of the mower deck 114, may also be provided.

The control system 200 of the mower 100 may also include a velocity control system 222, an exemplary embodiment of which will now be described with reference to FIGS. 3-8B. Generally speaking, the velocity control system 222 permits the operator to limit or adjust a maximum forward velocity of the mower (the speed resulting when the levers 202 are resting against the forward stop 204) without varying the engine throttle (e.g., while the engine maintains a constant level of output).

In the illustrated embodiment, the system 222 may include a velocity adjustment mechanism having a drive velocity adjustment member or lever 224 pivotally attached to the chassis and located in or near the mower control area. The drive velocity adjustment member 224 is operatively coupled to both the first and second control levers 202 as further described below. In the illustrated embodiment, the adjustment member 224 pivots about a horizontal transverse axis, as represented by arrows 223, within the confines of a slot 225 formed in the chassis.

When the operator pulls the member 224 to a first position or setting identified by reference numeral 223a, the maximum forward velocity of the mower (e.g., of each drive wheel), when its respective drive control lever is in the second position, is limited or set to a first predetermined value (e.g., a minimum or zero velocity setting). However, when the member 224 is moved to a second position or setting identified by reference numeral 223b, the maximum forward velocity of the mower (e.g., of each drive wheel), when its respective drive control lever is again in the second position, is limited or set to a second predetermined value (e.g., a maximum velocity setting) that is greater than the first predetermined value. Intermediate positions of the member 224 (e.g., like the position illustrated in FIG. 3) result in incremental changes to the maximum forward velocity. Stated alternatively, when the member 224 is at the first setting, a ratio of motion of each of the first and second control levers 202 to velocity of its associated drive member 106 is set to a first value. However, when the member 224 is at the second setting, the ratio of motion of each of the first and second control levers to velocity of its associated drive member is set to a second value that is greater than the first value. Once again, as described below, these velocity variations may occur while the output (e.g., throttle) of the engine is maintained at a constant level.

Figure 4:
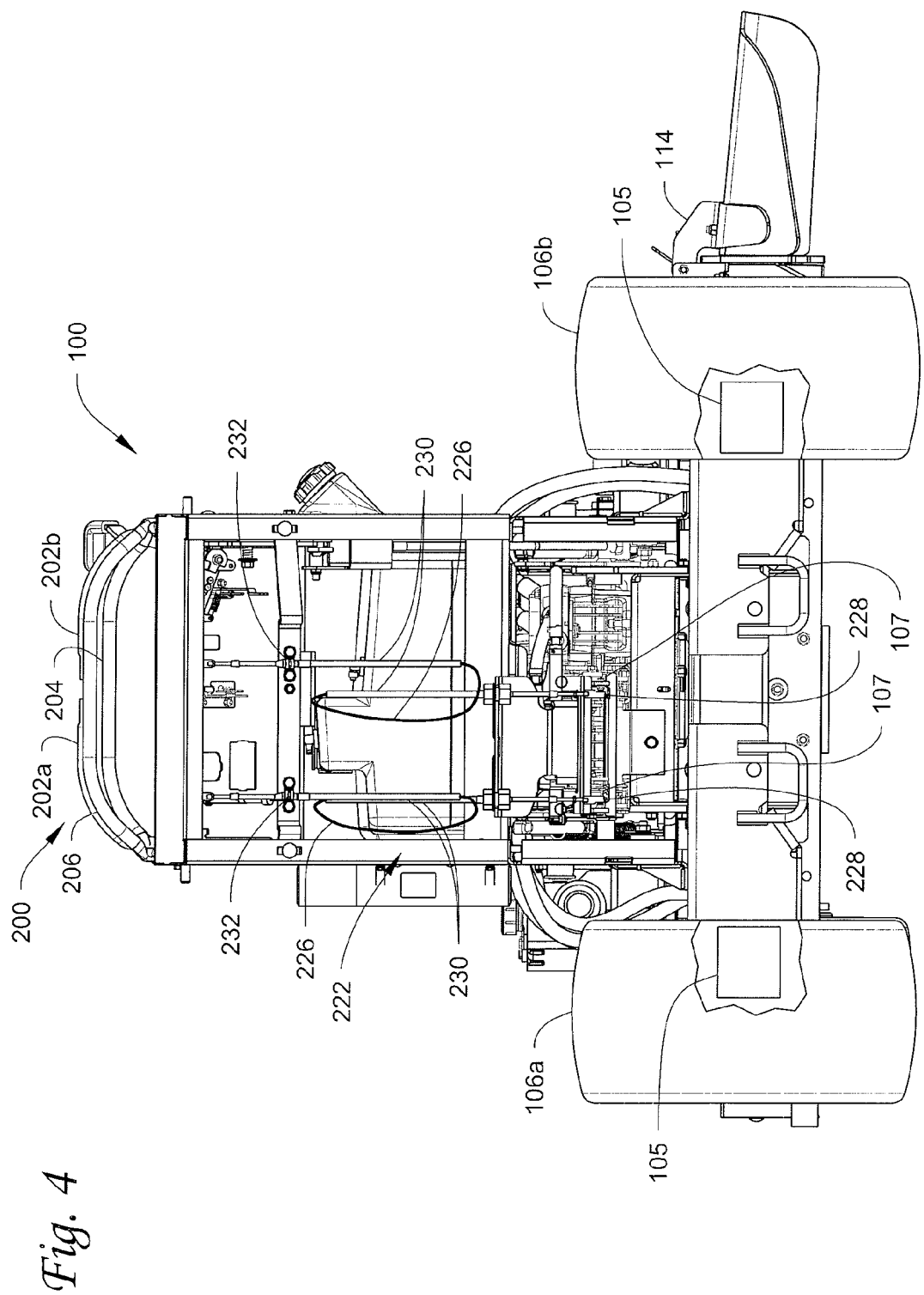
FIG. 4 is a rear elevation view of the mower of FIG. 1 with some structure removed for clarity.
Figure 5:
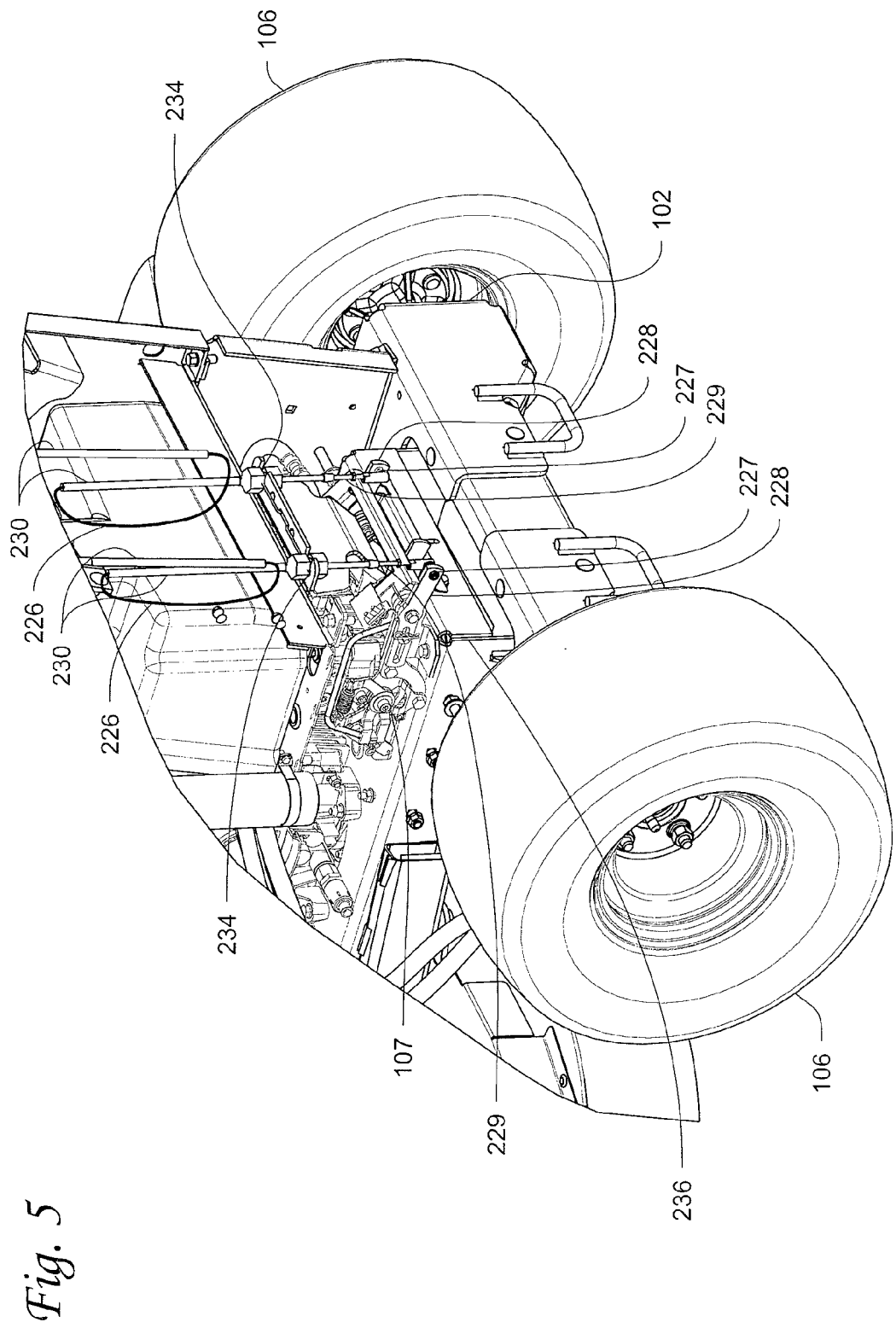
FIG. 5 is a partial rear perspective view of the mower of FIG. 1 with some structure removed for clarity.

FIGS. 4 and 5 illustrate a rear view and a partial perspective view, respectively, of the mower 100 with various structure removed. As illustrated in these views, each control lever 202 may be connected to an interconnecting member such as a cable core 229 of separate Bowden cables 226, wherein the opposite end of the core is operatively connected to respective hydraulic pumps 107 (only one visible in FIG. 5). In one embodiment, the core 229 of the cable 226 connects to a bellcrank 228 via a cable attachment point 227 as described in more detail below. As a result, pivotal movement of the control lever 202 may result in corresponding pivotal movement of its respective bellcrank 228.

In the illustrated embodiment, each cable 226 is surrounded by split guides 230. The top portion of each guide 230 is anchored to a fixed frame portion of the chassis 102 at anchor points 232, e.g., beneath the controls, while a bottom portion of each guide is anchored to anchor points 234 located on a movable carrier portion 236 of the chassis. The carrier 236, upon which the engine 104, deck 114, and hydraulic pumps 107 may be attached, may be vertically movable relative to fixed frame portions of the chassis 102 under control of the deck height adjustment lever 216 (see FIG. 3). Thus, the carrier 236 may be moved relative to the remaining portion of the chassis 102 to accommodate different mowing heights. The cables 226, extending through their respective split guides, may permit control of the pumps 107 via movement of the control levers 202 regardless of the position of the carrier 236.

Figure 6:
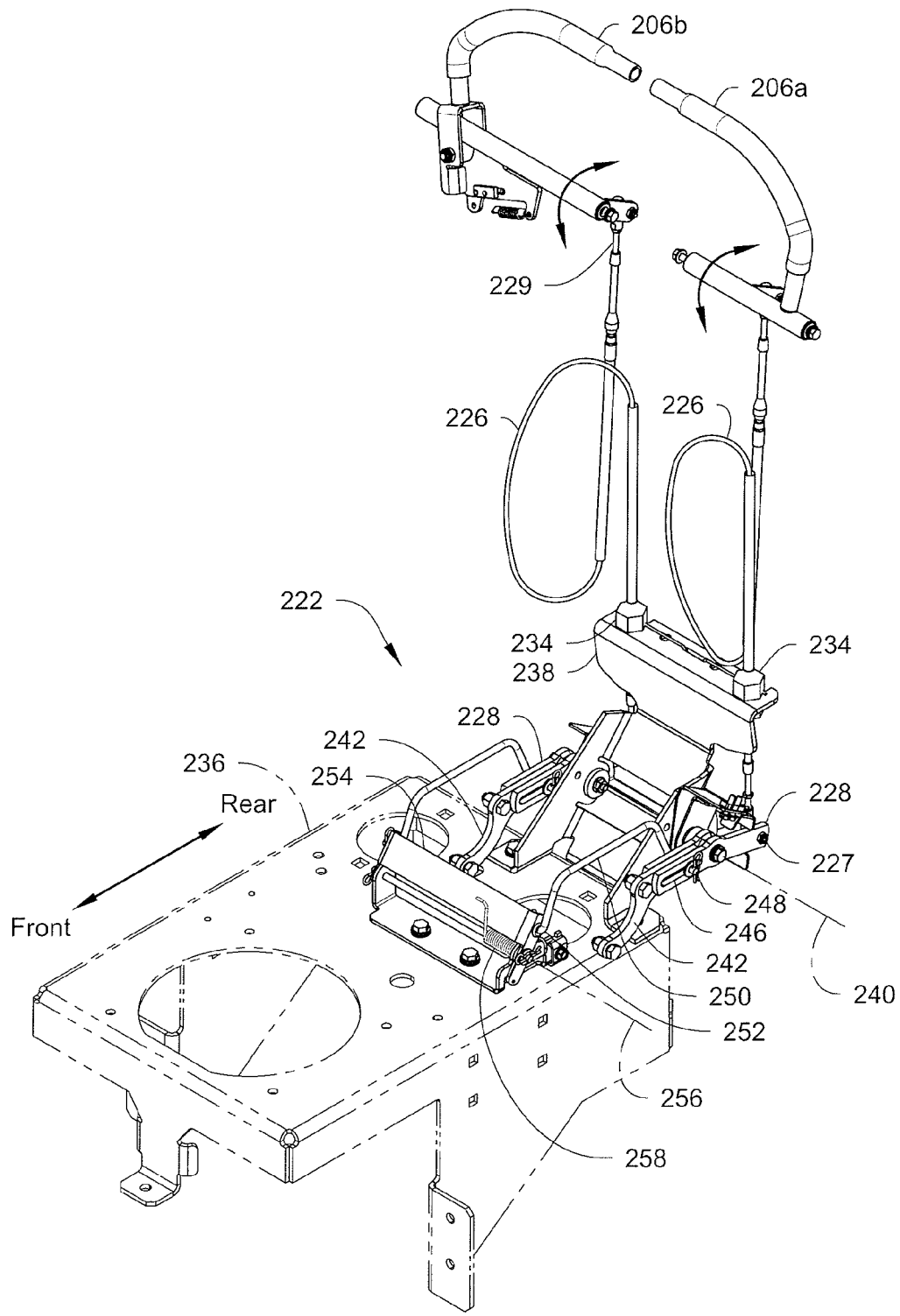
FIG. 6 is a perspective view of the velocity control system of the mower of FIG. 1 with some structure removed for clarity.

FIG. 6 illustrates a perspective view of a portion of an exemplary velocity control system 222 in accordance with one embodiment of the invention. As illustrated in this view, a bracket 238 may be attached to the carrier 236 near the rear of the mower as shown. The bracket 238 may not only support the anchor points 234, but may also define a pivot axis 240 about which each bellcrank 228 may pivot.

As further shown in FIG. 6, each bellcrank 228 may form a clevis towards its forward end. Nested between the clevis may be an arm 242 that operatively attaches to a portion of the respective pump 107 (pump not illustrated in FIG. 6). Both the bellcrank 228 and the arm 242 may define elongate slots 246 that receive a pin 248 formed by an end of a wire form 250 as shown in FIG. 6. Each pin end 248 may include bushings or roller bearings (e.g., three roller bearings) to allow smooth movement of the pin along the slots 246 (note that all the various joints and attachment points described and illustrated herein are understood to, where appropriate, include corresponding hardware such as bolts, washers, nuts, and spring clips, as well as bushings and bearings, to ensure the joint/attachment point operates as intended. However, this hardware is, for the sake of brevity, not described in detail herein).

Each wire form 250 may also have a forward end defining a forward pin 252 that is pivotally attached to a movable member 254 that is itself pivotally attached, at least in one embodiment, to the carrier 236 (e.g., via a bracket as shown) for pivoting about a pivot axis 256. The movable member 254 may be biased about the axis 256 by a biasing member, e.g., torsion spring 258.

Figure 7A:
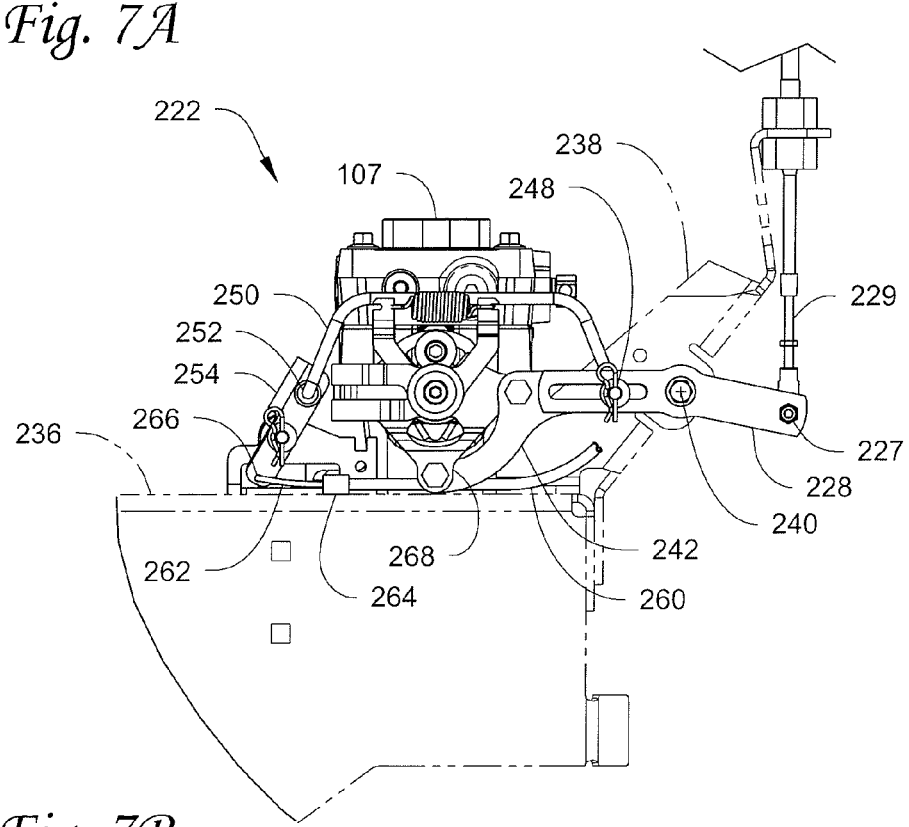
Figure 7B:
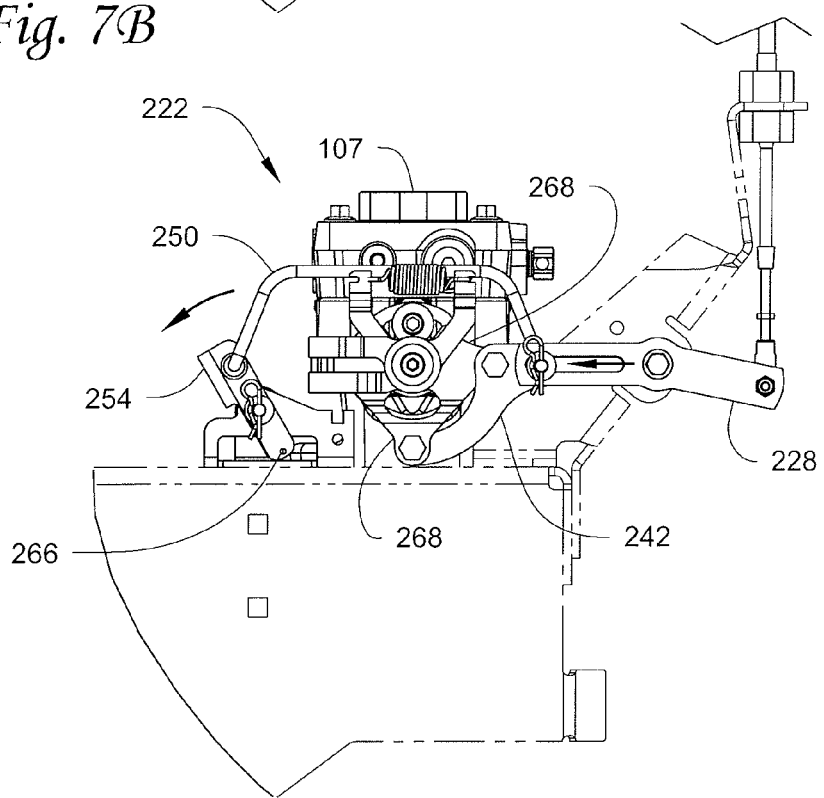

FIGS. 7A and 7B illustrate side elevation views of a left side of the velocity control system 222 shown in FIG. 5 (some structure removed for clarity). In addition to the various components of the system described above with reference to FIGS. 4-6, FIGS. 7A and 7B also illustrate the pump 107 and a velocity control cable 260 (only left side shown). The cable 260 may be a conventional Bowden cable anchored, at its upper end, proximate the velocity adjustment control member 224 (see FIG. 3) such that movement of the lever 224 about a transverse axis as shown in FIG. 3 causes a core 262 of the cable 260 to move. For example, in one embodiment, the casing of the cable 260 may be anchored at an anchor point 264 proximate the movable member 254. The core 262 may then protrude outwardly from the casing towards the movable member 254 as shown in FIG. 7A.

The terminal end of the core 262 may then engage a feature, e.g., aperture 266 (see also FIGS. 7B and 8A-8B where the cable 260 and anchor point 264 are removed for illustration purposes), formed in the movable member 254. As a result, movement of the control lever 224 (e.g., between the first position 223a and the second position 223b as shown in FIG. 3) may displace the movable member 254 in corresponding fashion. For example, FIG. 7A illustrates the system when the control lever 224 is set to its lowest speed setting (e.g., the first position 223a), while FIG. 7B illustrates the system when the lever 224 is set to its highest speed setting (e.g., the second position 223b). In both FIGS. 7A and 7B, the control levers 202 (and thus the cables 226, bellcranks 228, and pumps 107) are in their respective neutral positions.

FIGS. 7A and 7B further illustrate how the arm 242 may attach to lugs 268 on the pump 107. For example, each arm 242 may define two spaced-part attachment points that connect, e.g., bolt, to the lugs 268 of the pump. The lugs may be part of a bracket that pivotally moves to alter the flow rate and direction of fluid delivered by the pump.

Figure 8A:
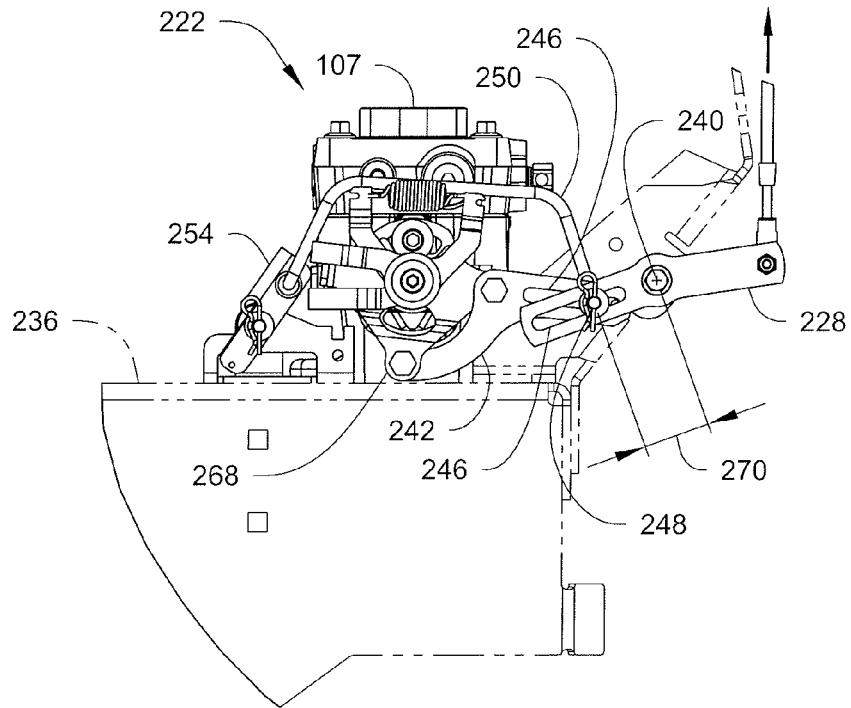
Figure 8B:
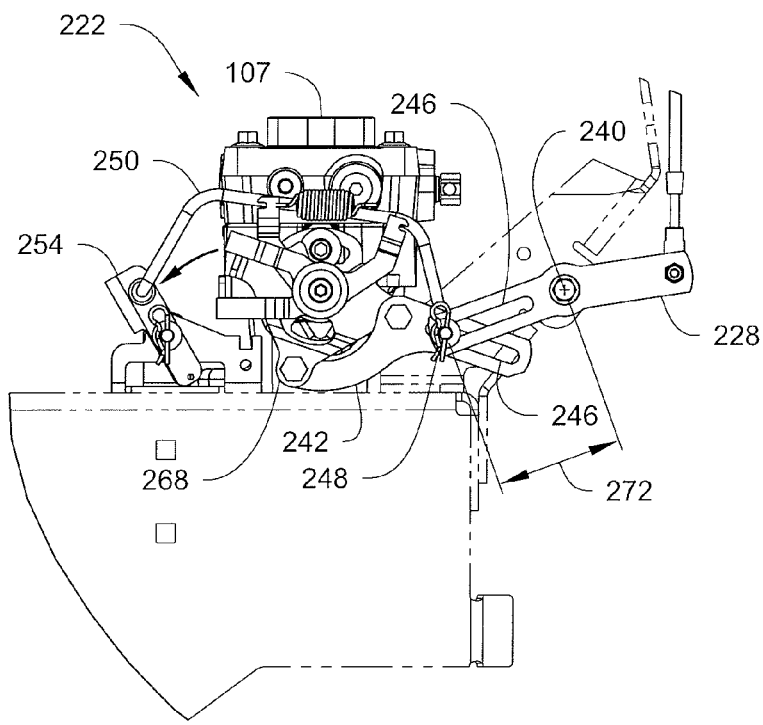

FIGS. 8A and 8B illustrate side elevation views of the left side of the velocity control system similar to those shown in FIGS. 7A and 7B, respectively. However, in these views, the control lever 202 is positioned for maximum forward velocity, e.g., the respective control lever 202 is pivoted forward in FIG. 3 until it abuts the forward stop 204. That is, FIG. 8A illustrates the system when the control lever 202 is in its full forward position and the drive velocity adjustment member 224 is set to its lowest velocity setting (e.g., positioned at location 223a in FIG. 3). Conversely, FIG. 8B illustrates the system when the control lever 202 is again in its full forward position, but the drive velocity adjustment lever 224 is set to its highest velocity setting (e.g., positioned at location 223b in FIG. 3).

As these figures illustrate, movement of the drive velocity adjustment member 224 between positions 223a to 223b in FIG. 3 results in corresponding movement of the movable member 254 between the positions shown in FIGS. 8A and 8B, respectively. Accordingly, when the lever 224 is set to the lowest velocity setting, the movable member 254 is pivoted (e.g., about the axis 256 of FIG. 6) rearwardly as shown in FIG. 8A. This causes the pin end 248 of the wire form 250 to be pushed rearwardly within the slots 246 formed in the bellcrank 228 and arm 242. As a result, the pin 248 is relatively close to the pivot axis 240 about which the bellcrank 228 pivots (e.g., the pin is separated from the axis 240 by a distance 270 as shown in FIG. 8A). Thus, for a given pivotal movement of the bellcrank 228 (e.g., resulting from movement of the control levers 202 from the neutral position to the maximum forward position), a corresponding movement of the arm 242 and lugs 268 of the pump 107 will result.

When the drive velocity adjustment member 224 is, however, set to the maximum velocity setting, the movable member 254 may be pivoted (e.g., about the axis 256 of FIG. 6) forwardly as shown in FIG. 8B. This causes the pin end 248 of the wire form 250 to correspondingly move forwardly within the slots 246 formed in the bellcrank 228 and arm 242. As a result, the pin end 248 moves away from the pivot axis 240 as compared to its position in FIG. 8A (e.g., the pin end 248 is now separated by a distance 272 that is greater than the distance 270 illustrated in FIG. 8A). Thus, for the same pivotal movement of the bellcrank 228 as that illustrated in FIG.

8A, the corresponding movement of the arm 242 (and therefore the lugs 268 of the pump 107) will be greater when the adjustment member 224 is in its maximum velocity position than for any other setting. As a result, the maximum forward velocity of the mower 100 that results from full forward positioning of the control levers 202 can be altered by movement of the adjustment member 224 without varying the output level of the engine 104.

Once again, while only the left side of the velocity control system is illustrated in FIGS. 7A-7B and 8A-8B, it is understood that the right side is substantially a mirror image (however, as shown in FIG. 4, the velocity control system may be offset to one side or the other of the mower rather than being symmetrically positioned).

Moreover, while two positions of the system are illustrated in FIGS. 8A and 8B, those of skill in the art will understand that an infinite number of intermediate positions of the drive velocity adjustment lever 224 may exist and that such intermediate positions may result in a corresponding infinite number of intermediate positions of the member 254, wire form 250, bellcrank 228, arm 242, and pump 107.

An exemplary embodiment illustrative of the present invention may be configured as shown and described herein. The control levers 202 may each have a range of motion (the approximate linear distance from their neutral positions to their full forward positions) equivalent to about four inches. When the velocity adjustment member 224 is set to its fastest position (position 223b in FIG. 3), movement of the control levers 202 over the full four inch range (e.g., from neutral to full forward positions) may result in a vehicle speed ranging between zero miles per hour or mph (at the neutral position) and a maximum of about eight mph (at the full forward position). However, when the adjustment member 224 is set to the slowest position (e.g., the position 223a in FIG. 3), movement of the control levers 202 over the same full four inch range may result in a vehicle speed ranging between zero mph (at the neutral position) and a maximum of about two mph (at the full forward position). As one may appreciate, intermediate settings of the adjustment member 224 may result in correspondingly intermediate limits to the maximum vehicle velocity (e.g., when the adjustment member is centered, movement of the control levers 202 over the same full four inch range may result a vehicle speed ranging between zero mph and a maximum of about five mph). Accordingly, the vehicle's maximum velocity may be slowed, e.g., for operations in areas where lower speed may be desirable, without reducing the travel of the control levers and without changing their full forward location.

While this example describes a configuration having four inches of control lever travel, such a configuration is presented merely as an exemplary range suitable to typical human hand ergonomics for a walk-behind/ride-behind mower such as that illustrated herein. Other embodiments providing more or less travel to accommodate specific functionality are certainly possible. Similarly, the various speed ranges described (e.g., zero to four mph and zero to eight mph) are also exemplary and not intended to limit the scope of the invention. Embodiments of the present invention may thus permit operator manipulation of the maximum speed of a vehicle, for a maximum speed control input (e.g., control lever motion), without altering the output level of the vehicle power source. As a result, the operator may place the speed controls in a maximum velocity position and then alter the vehicle velocity without altering the power delivery to other vehicle subsystems.

Thus, like a lever travel limiter, embodiments of the present invention may provide a technique to limit maximum vehicle velocity while the control levers are forced against a forward stop. However, unlike travel limiters, embodiments of the present invention permit full, unrestricted travel of the control levers regardless of the velocity adjustment member setting. Moreover, control systems in accordance with embodiments of the present invention may permit dynamic adjustment of the maximum vehicle velocity (e.g., the adjustment member 224) while the vehicle is in motion.

Illustrative embodiments of this invention are discussed and reference has been made to possible variations within the scope of this invention. These and other variations, combinations, and modifications in the invention will be apparent to those skilled in the art without departing from the scope of the invention, and it should be understood that this invention is not limited to the illustrative embodiments set forth herein. Accordingly, the invention is to be limited only by the claims provided below and equivalents thereof.

What is claimed is:

1. A walk-behind or ride-behind self-propelled vehicle comprising:
    a chassis;
    first and a second drive wheels coupled to opposing sides of the chassis for propelling the vehicle over a ground surface;
    first and second hydraulic pumps coupled to the chassis and operable to power the first and second drive wheels, respectively;
    an engine attached to the chassis and operatively coupled to the hydraulic pumps, the engine configurable to deliver a constant level of output;
    first and second control levers pivotally attached to the chassis and operable to independently vary, while the engine maintains the constant level of output, a velocity of the first and second drive wheels, respectively, each control lever movable incrementally between a first position corresponding to zero velocity of its respective drive wheel, and a second position corresponding to a maximum forward velocity of its respective drive wheel;
    a bellcrank pivotally coupled to the chassis, the bellcrank pivotable in response to movement of one of the control levers;
    an arm attached to one of the hydraulic pumps, wherein the arm and the bellcrank are connected via a pin passing through elongate slots formed in both the bellcrank and the arm; and
    a drive velocity adjustment lever pivotally attached to the chassis and operatively coupled to both the first and second control levers, the velocity adjustment lever movable, while the engine maintains the constant level of output, between: a first setting wherein the maximum forward velocity of each drive wheel, when its respective control lever is in the second position, is limited to a first predetermined value; and a second setting wherein the maximum forward velocity of each drive wheel, when its respective control lever is in the second position, is limited to a second predetermined value greater than the first predetermined value.

2. The vehicle of claim 1, wherein the chassis further comprises a fixed frame portion and a carrier portion, the carrier portion selectively movable relative to the fixed frame portion.

3. The vehicle of claim 2, wherein the engine and hydraulic pumps are attached to the carrier portion.

4. The vehicle of claim 2, further comprising a cutting deck attached to the carrier portion.

5. The vehicle of claim 1, wherein the drive velocity adjustment lever is mechanically coupled to the pin.

6. The vehicle of claim 1, further comprising a platform to receive an operator, the platform movable from a first stowed position to a second deployed position.

7. A walk-behind or ride-behind self-propelled lawn mowing vehicle comprising:
- a chassis;
- a cutting deck attached to the chassis;
- first and second drive wheels coupled to opposing sides of the chassis, the first and second drive wheels each powered by first and second hydraulic motors, respectively;
- first and second hydraulic pumps attached to the chassis for powering the first and second hydraulic motors, respectively;
- an engine attached to the chassis and operatively coupled to both of the hydraulic pumps, the engine selectively configurable to deliver a constant level of output to both of the hydraulic pumps;
- first and second control levers pivotally attached to the chassis and connected to the first and second hydraulic pumps, respectively, and operable to independently vary, while the engine delivers the constant level of output, a velocity of the first and second drive wheels, respectively, each control lever movable incrementally between a first position corresponding to a minimum forward velocity of its respective drive wheel, and a second position corresponding to a maximum forward velocity of its respective drive wheel; and
- a drive velocity adjustment lever pivotally attached to the chassis and operatively coupled to both the first and second control levers, the velocity adjustment lever movable, while the engine delivers the constant level of output, between: a first setting wherein the maximum forward velocity of each drive wheel, when its respective control lever is in the second position, is limited to a first predetermined value; and a second setting wherein the maximum forward velocity of each drive wheel, when its respective control lever is in the second position, is limited to a second predetermined value greater than the first predetermined value.

8. The vehicle of claim 7, wherein the chassis further comprises a carrier portion that is movable relative to a fixed portion.

9. The vehicle of claim 8, wherein one or more of the cutting deck, the engine, and the first and second hydraulic pumps is attached to the carrier portion.

10. The vehicle of claim 7, wherein the vehicle further comprises an operator platform.

11. The vehicle of claim 10, wherein the operator platform is movable between a deployed position and a stowed position.

12. The vehicle of claim 7, further comprising:
- a bellcrank coupled to the chassis and pivotable relative to the chassis in response to movement of one of the control levers;
- an arm proximate the bellcrank and attached to one of the hydraulic pumps, wherein the arm and the bellcrank each define elongate slots; and
- a pin coupling the bellcrank to the arm by passing through the elongate slots, the pin movable along the slots in response to movement of the drive velocity adjustment lever.

13. The vehicle of claim 12, further comprising an interconnecting member extending between the drive velocity adjustment lever and the pin.

14. The vehicle of claim 13, wherein the interconnecting member comprises a cable.

* * * * *